(12) United States Patent
Tanner

(10) Patent No.: US 8,807,171 B1
(45) Date of Patent: Aug. 19, 2014

(54) METHOD AND SYSTEM FOR LINING PIPES

(76) Inventor: Jeffrey M. Tanner, Zanesville, OH (US)

( * ) Notice: Subject to any disclaimer, the term of this patent is extended or adjusted under 35 U.S.C. 154(b) by 511 days.

(21) Appl. No.: 13/316,696

(22) Filed: Dec. 12, 2011

Related U.S. Application Data

(60) Provisional application No. 61/437,885, filed on Jan. 31, 2011.

(51) Int. Cl.
*F16L 55/18* (2006.01)

(52) U.S. Cl.
USPC ............. 138/98; 138/97; 156/294; 156/156; 156/287; 405/150.1; 264/516

(58) Field of Classification Search
CPC ............ F16L 55/165; F16L 55/1651–55/1654
USPC ............ 138/98, 97; 156/294, 287; 405/150.1, 405/184.2; 264/516
See application file for complete search history.

(56) References Cited

U.S. PATENT DOCUMENTS

| | | | |
|---|---|---|---|
| 4,135,958 A | 1/1979 | Wood | |
| 4,350,548 A * | 9/1982 | Zenbayashi et al. | 156/156 |
| 4,680,066 A | 7/1987 | Wood | |
| 4,685,983 A * | 8/1987 | Long, Jr. | 156/64 |
| 4,776,370 A * | 10/1988 | Long, Jr. | 138/98 |
| 4,778,553 A * | 10/1988 | Wood | 156/287 |
| 5,200,011 A * | 4/1993 | Imamura et al. | 156/156 |
| 5,490,964 A * | 2/1996 | Kamiyama et al. | 264/36.17 |
| 5,503,190 A * | 4/1996 | Kamiyama et al. | 138/98 |
| 5,566,719 A | 10/1996 | Kamiyama | |
| 6,029,726 A | 2/2000 | Tweedie | |
| 6,058,978 A | 5/2000 | Paletta | |
| 6,068,725 A | 5/2000 | Tweedie | |
| 6,093,363 A | 7/2000 | Polivka | |
| 6,270,289 B1 * | 8/2001 | Einhaus et al. | 405/184.2 |
| 6,682,668 B1 | 1/2004 | Driver | |
| 6,708,728 B2 | 3/2004 | Driver | |
| 7,311,122 B2 * | 12/2007 | Kamiyama et al. | 138/98 |
| 7,360,559 B2 | 4/2008 | Driver | |
| 7,686,054 B2 * | 3/2010 | Kamiyama et al. | 156/423 |
| 7,713,374 B2 * | 5/2010 | Kamiyama et al. | 156/294 |
| 7,803,245 B2 * | 9/2010 | Kamiyama et al. | 156/294 |
| 8,016,750 B2 | 9/2011 | Saadat | |
| 8,038,913 B2 | 10/2011 | Driver | |
| 2006/0225802 A1 * | 10/2006 | Kamiyama et al. | 138/98 |
| 2007/0029688 A1 | 2/2007 | Delaney | |
| 2007/0163665 A1 | 7/2007 | Lepola | |
| 2007/0275162 A1 | 11/2007 | Kamiyama | |
| 2008/0047624 A1 * | 2/2008 | Iwasaki-Higbee | 138/98 |
| 2009/0194183 A1 | 8/2009 | Kiest, Jr. | |
| 2009/0205733 A1 | 8/2009 | Stringfellow | |
| 2010/0154187 A1 * | 6/2010 | Kamiyama et al. | 29/402.16 |

* cited by examiner

*Primary Examiner* — Patrick F Brinson
(74) *Attorney, Agent, or Firm* — Jason L. Gilbert

(57) ABSTRACT

A method and system for lining pipes which utilizes an in-line water heater to improve efficiency when lining long lengths of pipe. The method and system for lining pipes generally includes a pipe lining machine and a water heater. The outlet of the pipe lining machine will generally be connected to the inlet of the water heater by a first conduit. The outlet of the water heater will generally be connected to a second conduit and the linet of the pipe lining machine will generally be connected to a third conduit. A non-metallic liner is extended through the pipe to be lined and connected at either end to the respective ends of the pipe, the end of the second conduit and the end of the third conduit. By placing a water heater in-line with the pipe lining machine, the pipe lining capability of the pipe lining machine may be greatly improved.

20 Claims, 5 Drawing Sheets

METHOD AND SYSTEM FOR LINING PIPES

CROSS REFERENCE TO RELATED APPLICATIONS

I hereby claim benefit under Title 35, United States Code, Section 119(e) of U.S. provisional patent application Ser. No. 61/437,885 filed Jan. 31, 2011. The 61/437,885 application is hereby incorporated by reference into this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to a pipe lining system and more specifically it relates to a method and system for lining pipes which utilizes an in-line water heater to improve efficiency when lining long lengths of pipe.

2. Description of the Related Art

Any discussion of the related art throughout the specification should in no way be considered as an admission that such related art is widely known or forms part of common general knowledge in the field.

Pipe lining systems have been in use for years for repairing damaged or leaking pipes such as underground gas and water lines. In the past, pipe lining systems have been limited in their efficiency due to limitations on the generation of hot water and steam by existing, prior art pipe lining systems.

When using such systems, it is often required that the lining process be repeated many times for lining longer pipes. The limitations on lengths of pipe which can be lined by existing pipe lining systems which do not utilize an in-line water heater result in pipe lining functionality which is far more complicated and time-consuming when compared with the functionality of the present invention.

Because of the inherent problems with the related art, there is a need for a new and improved method and system for lining pipes which utilizes an in-line water heater to improve efficiency when lining long lengths of pipe.

BRIEF SUMMARY OF THE INVENTION

The invention generally relates to a pipe lining system and method which includes a pipe lining machine and a water heater. The outlet of the pipe lining machine will generally be connected to the inlet of the water heater by a first conduit. The outlet of the water heater will generally be connected to a second conduit and the inlet of the pipe lining machine will generally be connected to a third conduit. A non-metallic liner is extended through the pipe to be lined and connected at either end to the respective ends of the pipe, the end of the second conduit and the end of the third conduit. By placing a water heater in-line with the pipe lining machine, the pipe lining capability of the pipe lining machine may be greatly improved.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

Figure 1:
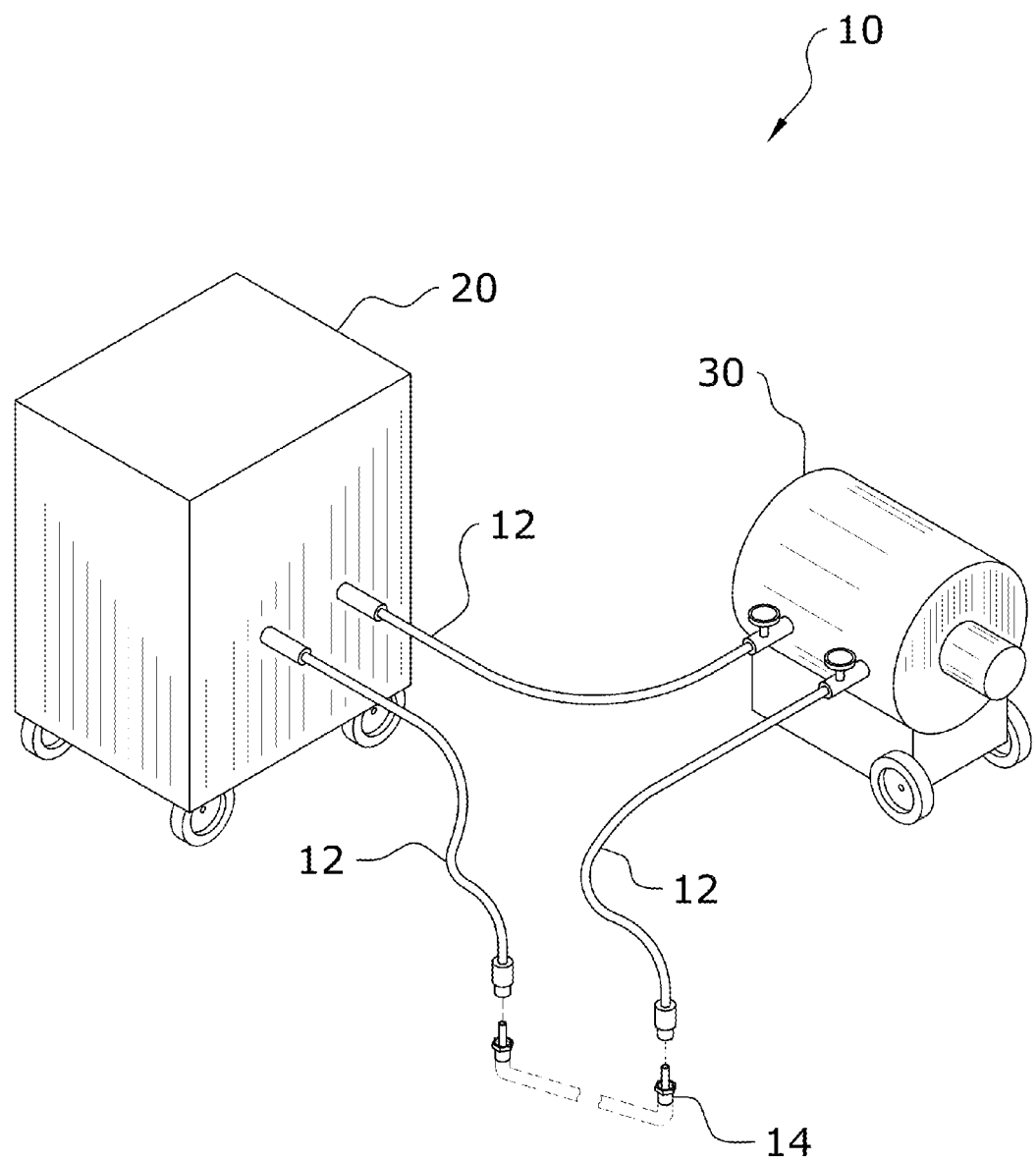
FIG. 1 is an upper perspective view of the present invention being installed.

A. Overview.

Turning now descriptively to the drawings, in which similar reference characters denote similar elements throughout the several views, FIGS. 1 through 5 illustrate an auxiliary pipe lining heating system 10, which generally comprises a pipe lining machine 20 and a water heater 30. The outlet of the pipe lining machine 20 will generally be connected to the inlet of the water heater 30 by a first conduit 12. The outlet of the water heater 30 will generally be connected to a second conduit 12 and the inlet of the pipe lining machine 20 will generally be connected to a third conduit 12. A non-metallic liner 16 is extended through the pipe 14 to be lined and connected at either end to the respective ends of the pipe 12, the end of the second conduit 12 and the end of the third conduit 12. By placing a water heater 30 in-line with the pipe lining machine 20, the pipe lining capability of the pipe lining machine 20 may be greatly improved.

B. Pipe Lining Machine.

FIG. 1 illustrates a preferred pipe lining machine 20 for use with the present invention. The present invention is adapted to be used in combination with a pipe lining machine 20 as is known in the art. The present invention may be utilized with various types of pipe lining machines 20, but will preferably be utilized with a pipe lining machine 20 which utilizes a conduit 12 extended into a pipe 14 to be lined that is connected to a liner 16. The diameter of the liner 16 is expanded within the piping 14 such that the outer liner 16 comes into contact with the inner walls of the piping 14.

The liner 16 may be comprised of various substances. In a preferred embodiment, the liner 16 of the present invention will be comprised of thermoplastic such as polyethylene terephthalate. Further, the outer liner 16 may be comprised of various substances so long as they are secured to a structure by the application of heat and cured by the application of cold. In a preferred embodiment, the outer liner 16 for lining of the piping 14 may be comprised of a non-metallic liner.

Under conventional practices, air or water are heated by the pipe lining machine 20 in a manner which causes the liner 16 to be secured against the inner wall of the piping 14. Cooled air or water is then transferred through the liner 16 to cool and thus cure the liner 16 against the inner wall of the piping 14. However, the amount of pipe 14 to be lined has previously been limited by the lack of heating capacity of existing pipe lining machines 20. As such, it is preferable to increase the heating capacity of conventional pipe lining machines 20 in order to improve the length of piping 14 which may be lined by a single pipe lining machine 20.

While an exemplary pipe lining machine 20 has been described, it is appreciated by one of ordinary skill in the arts that various different types and arrangements of pipe lining machines 20 may be used with the present invention without affecting its overall operation. As such, the scope of the present invention should not be limited to any particular design of pipe lining machine 20. Further, in some embodiments, the pipe lining machine 20 and water heater 30 of the present invention may be integrally formed within a single housing.

Figure 2:
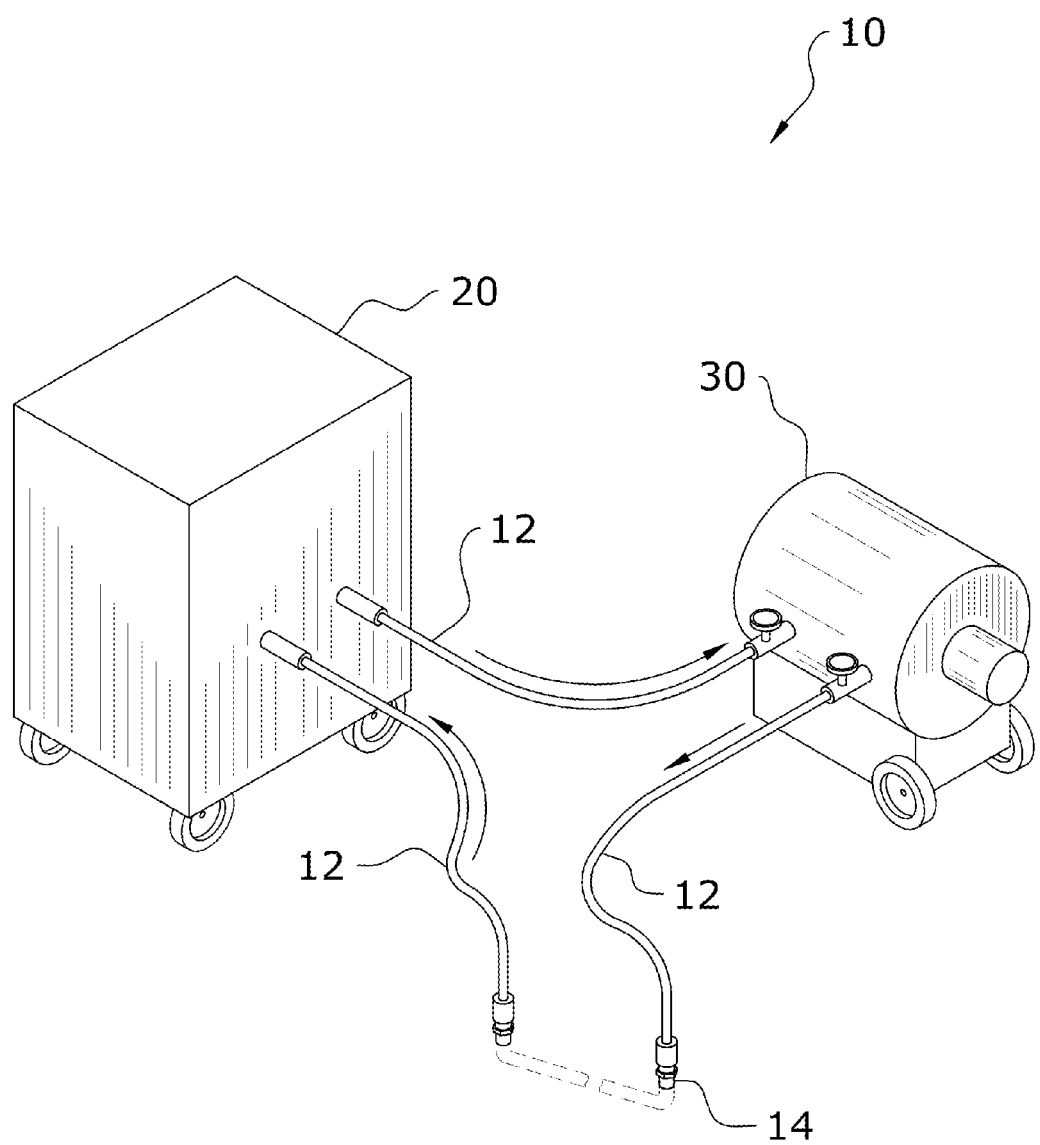
FIG. 2 is an upper perspective view of the present invention in use.

The pipe lining machine 20 of the present invention will generally include an inlet and an outlet. The outlet of the pipe lining machine 20 will generally be connected directly to the inlet of a water heater 30 and the inlet of the pipe lining machine 20 will generally receive a second end of the conduit which extends through the piping 14 to be lined as shown in FIG. 2.

C. Hot Water Heater.

The present invention will generally utilize a hot water heater 30 in-line with the pipe lining machine 20 for increasing the heat generated and thus the amount of piping 14 capable of being lined. It is appreciated that various types of hot water heaters 30 may be utilized with the present invention, including portable water heaters 30, gas water heaters 30, electric water heaters 30 and the like.

The water heater 30 used with the present invention will generally be comprised of a heater coil, valves, gauges, a circulating pump, an inlet and an outlet. The inlet of the water heater 30 will preferably accept the second end of a conduit 12, wherein the first end of the conduit 12 is connected to the outlet of the pipe lining machine 20 as shown in FIG. 2. The outlet of the water heater 30 will preferably be connected to a conduit 12 which leads into the piping 14 to be lined and is connected at its other end to the inlet of the pipe lining machine 20.

The scope of the present invention should not be limited to any particular type or construction of water heater 30, so long as the water heater 30 provided is capable of providing the volume of heated water necessary to line pipes of diameter up to 1½ inches and length of up to 75 feet.

D. Operation of Preferred Embodiment.

Figure 3:
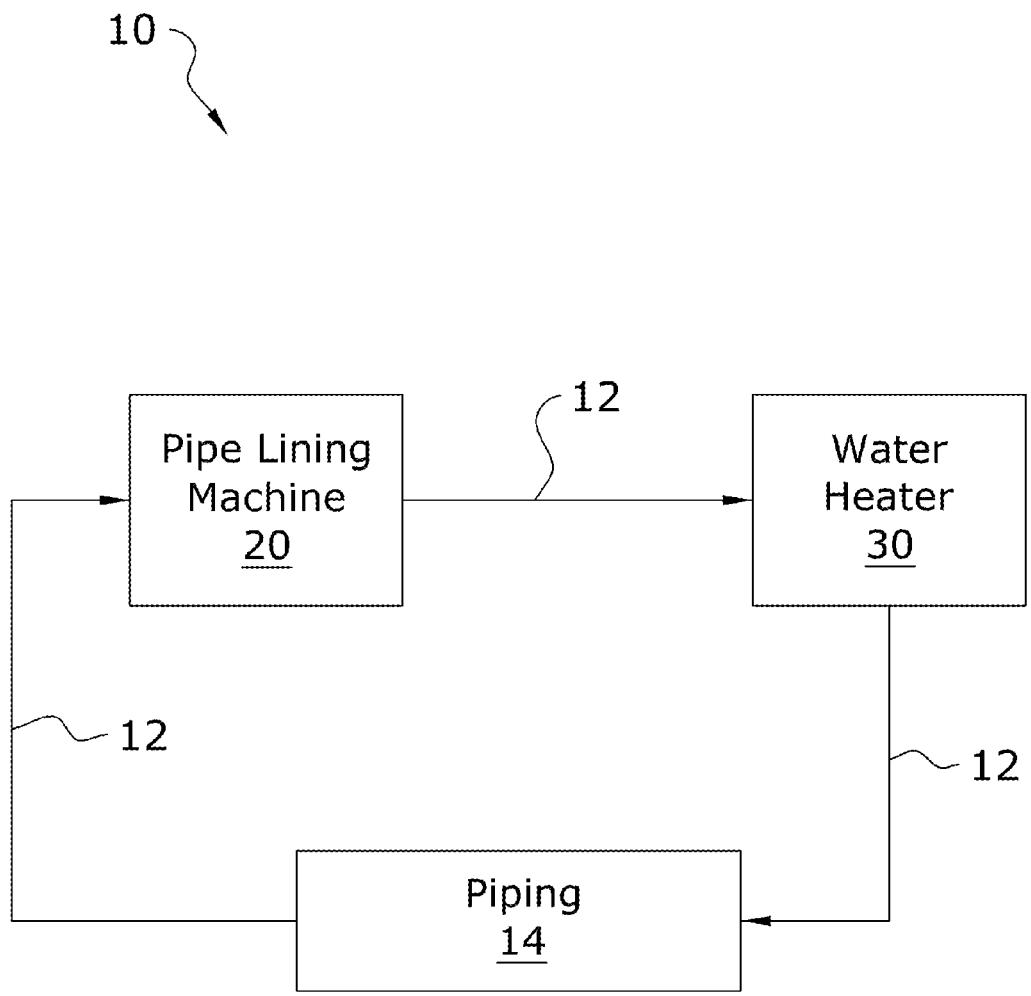
FIG. 3 is a block diagram illustrating the present invention.

FIG. 3 illustrates the initial setup of the present invention. First, the outlet of the pipe lining machine 20 is connected to the inlet of the water heater 30 by a first conduit 12. A second conduit 12 is then connected at a first end to the outlet of the water heater 30. A third conduit 12 is connected to the inlet of the pipe lining machine 20. The liner 16 is pulled or pushed through the pipe 14 and is connected to the end of both the pipe 14 and the second and third conduits 12 with a coupling (various types of couplings may be utilized without affecting the overall operation of the invention).

Figure 4:
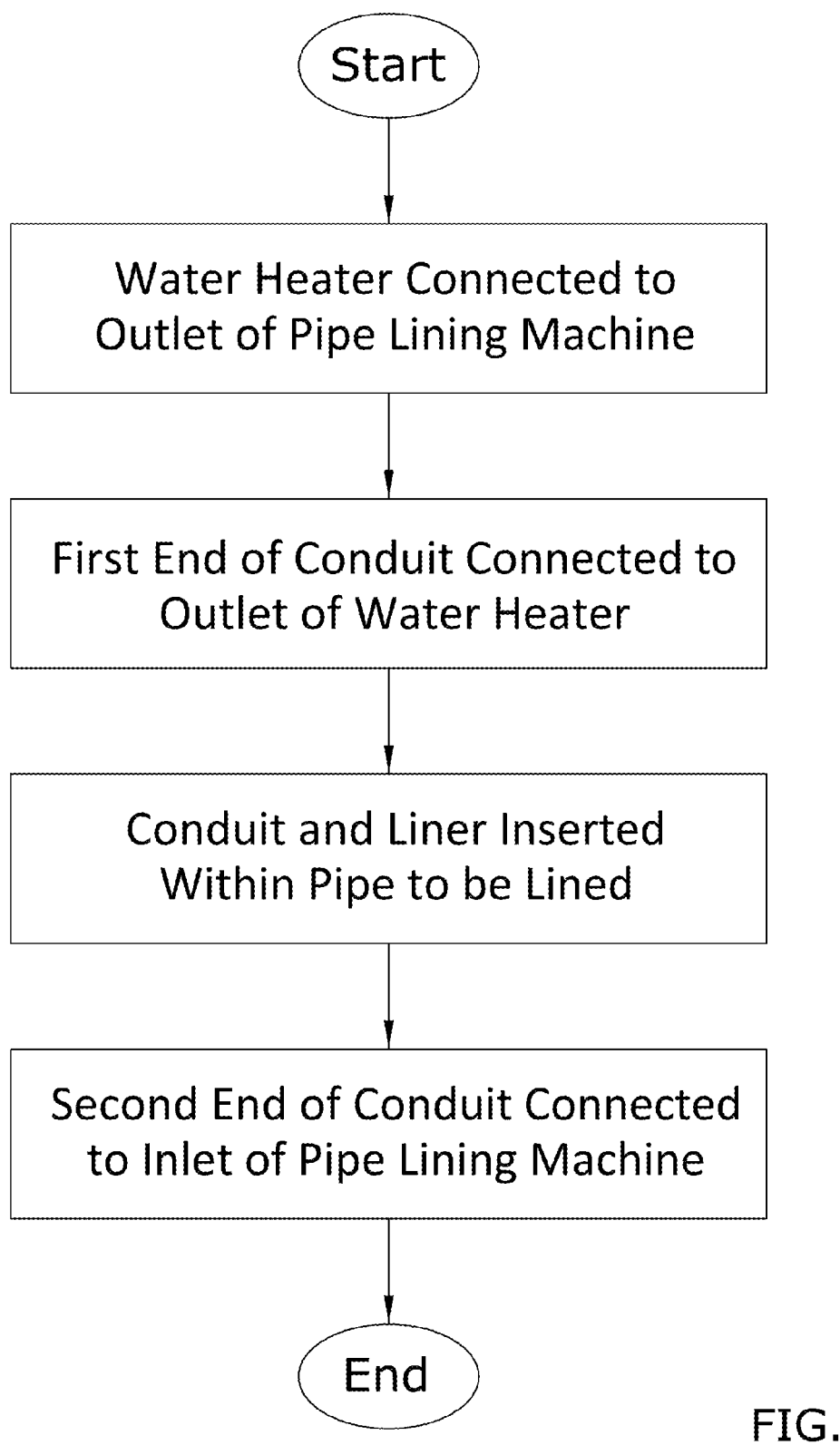
FIG. 4 is a first flowchart illustrating the operation of the present invention.
Figure 5:
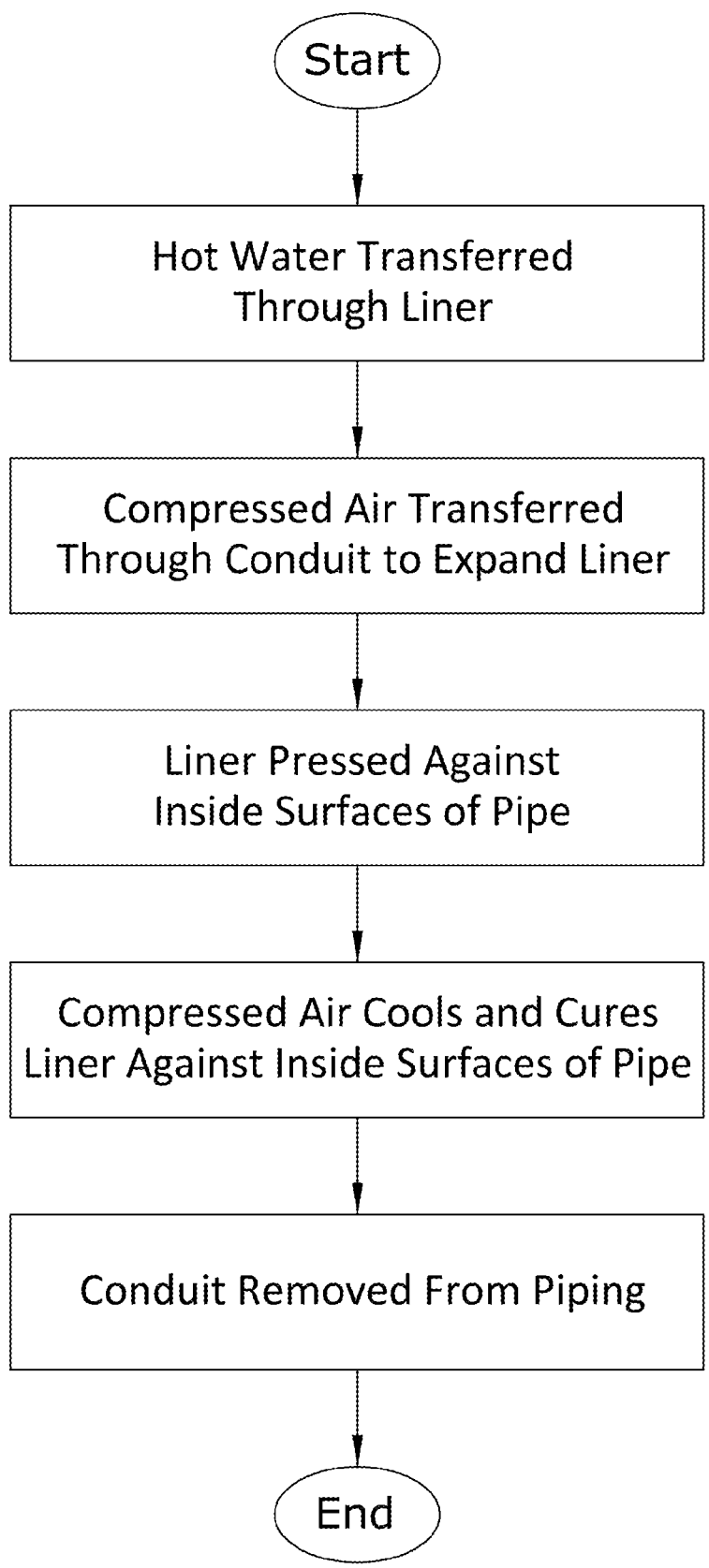
FIG. 5 is a second flowchart illustrating the operation of the present invention.

FIG. 4 illustrates the lining process of the present invention. After the initial setup is complete, hot water and/or vapor is transferred through the outer liner 16. Hot water is transferred through the liner 16 to expand the liner 16 and thus press the outer liner 16 against the inner wall of the piping 14 to be lined. Compressed air is then sent through the liner 16 to cool and cure the outer liner 16 lining against the interior surface of the piping 14. The non-metallic liner material will act to cover and seal any holes or defects within the piping 14. The coupling is then removed from the conduits 12 and the pipe 14 and the liner 16 is trimmed off against the respective ends of the pipe 14.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. In case of conflict, the present specification, including definitions, will control. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. A method for lining pipes utilizing an in-line water heater, comprising:
providing a pipe lining machine, wherein said pipe lining machine includes an inlet and an outlet;
connecting a first end of a first conduit to said outlet of said pipe lining machine;
providing a water heater, wherein said water heater includes an inlet and an outlet;
connecting a second end of said first conduit to said inlet of said water heater;
connecting a first end of a second conduit to said outlet of said water heater;
providing a liner for a pipe;
connecting a second end of said second conduit to a first end of said liner;
extending said liner through said pipe;
connecting a first end of a third conduit to a second end of said liner; and
connecting a second end of said third conduit to said inlet of said pipe lining machine.

2. The method for lining pipes utilizing an in-line water heater of claim 1, wherein said water heater is comprised of a gas water heater.

3. The method for lining pipes utilizing an in-line water heater of claim 1, wherein said water heater is comprised of a portable water heater.

4. The method for lining pipes utilizing an in-line water heater of claim 1, wherein said water heater is comprised of an electric water heater.

5. The method for lining pipes utilizing an in-line water heater of claim 1, further comprising the step of providing a first coupling, wherein said second conduit is connected to said liner by said first coupling.

6. The method for lining pipes utilizing an in-line water heater of claim 5, further comprising the step of providing a second coupling, wherein said third conduit is connected to said liner by said second coupling.

7. The method for lining pipes utilizing an in-line water heater of claim 1, further comprising the step of transferring heated water through said liner to expand said liner until said liner presses against an inner wall of said pipe.

8. The method for lining pipes utilizing an in-line water heater of claim 7, further comprising the step of directing compressed air through said liner to cool and cure said liner against said inner wall of said pipe.

9. The method for lining pipes utilizing an in-line water heater of claim 1, wherein said liner is comprised of a non-metallic liner.

10. The method for lining pipes utilizing an in-line water heater of claim 1, wherein said liner is comprised of a thermoplastic.

11. The method for lining pipes utilizing an in-line water heater of claim 1, wherein said liner is comprised of polyethylene terephthalate.

12. A method for lining pipes utilizing an in-line water heater, comprising:
  providing a pipe lining machine, wherein said pipe lining machine includes an inlet and an outlet;
  connecting a first end of a first conduit to said outlet of said pipe lining machine;
  providing a water heater, wherein said water heater includes an inlet and an outlet;
  connecting a second end of said first conduit to said inlet of said water heater;
  connecting a first end of a second conduit to said outlet of said water heater;
  providing a non-metallic liner for a pipe;
  connecting a second end of said second conduit to a first end of said liner;
  extending said liner through said pipe;
  connecting a first end of a third conduit to a second end of said liner;
  connecting a second end of said third conduit to said inlet of said pipe lining machine;
  transferring heated water from said water heater through said liner to expand said liner until said liner presses against an inner wall of said pipe; and
  directing compressed air through said liner to cool and cure said liner against said inner wall of said pipe.

13. The method for lining pipes utilizing an in-line water heater of claim 12, wherein said water heater is comprised of a gas water heater.

14. The method for lining pipes utilizing an in-line water heater of claim 12, wherein said water heater is comprised of a portable water heater.

15. The method for lining pipes utilizing an in-line water heater of claim 12, wherein said water heater is comprised of an electric water heater.

16. The method for lining pipes utilizing an in-line water heater of claim 12, further comprising the step of providing a first coupling, wherein said second conduit is connected to said liner by said first coupling.

17. The method for lining pipes utilizing an in-line water heater of claim 16, further comprising the step of providing a second coupling, wherein said third conduit is connected to said liner by said second coupling.

18. The method for lining pipes utilizing an in-line water heater of claim 12, further comprising the steps of disconnecting said second conduit and said third conduit from said liner and trimming off said liner against the respective ends of said pipe.

19. A method for lining pipes utilizing an in-line water heater, comprising:
  providing a pipe lining machine, wherein said pipe lining machine includes an inlet and an outlet;
  connecting a first end of a first conduit to said outlet of said pipe lining machine;
  providing a portable water heater, wherein said water heater includes an inlet and an outlet;
  connecting a second end of said first conduit to said inlet of said water heater;
  connecting a first end of a second conduit to said outlet of said water heater;
  providing a non-metallic liner for a pipe;
  connecting a second end of said second conduit to a first end of said liner with a first coupling;
  extending said liner through said pipe;
  connecting a first end of a third conduit to a second end of said liner with a second coupling;
  connecting a second end of said third conduit to said inlet of said pipe lining machine;
  transferring heated water from said water heater through said liner to expand said liner until said liner presses against an inner wall of said pipe;
  directing compressed air through said liner to cool and cure said liner against said inner wall of said pipe;
  disconnecting said second conduit from said liner;
  disconnecting said third conduit from said liner; and
  trimming off said ends of said liner against the respect ends of said pipe.

20. The method for lining pipes utilizing an in-line water heater of claim 19, wherein said liner is comprised of a thermoplastic.

\* \* \* \* \*